(12) United States Patent
Asada (10) Patent No.: US 10,576,617 B1
(45) Date of Patent: Mar. 3, 2020

(54) SERVICE ROBOT HAVING MOVABLE CENTER OF MASS

(71) Applicant: Boston Incubator Center, LLC, Waltham, MA (US)

(72) Inventor: Haruhiko Harry Asada, Lincoln, MA (US)

(73) Assignee: Boston Incubator Center, LLC, Lexington, MA (US)

( * ) Notice: Subject to any disclaimer, the term of this patent is extended or adjusted under 35 U.S.C. 154(b) by 410 days.

(21) Appl. No.: 15/243,364

(22) Filed: Aug. 22, 2016

Related U.S. Application Data (60) Provisional application No. 62/208,480, filed on Aug. 21, 2015.

(51) Int. Cl.
*B25J 5/00* (2006.01)
*B25J 11/00* (2006.01)
*B25J 9/16* (2006.01)

(52) U.S. Cl.
CPC ............. *B25J 5/007* (2013.01); *B25J 9/1694* (2013.01); *B25J 11/008* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 2010/0070132 A1* | 3/2010 | Doi | B60L 15/20 701/36 |
| 2017/0072989 A1* | 3/2017 | Moujoud | B62K 5/007 |

* cited by examiner

*Primary Examiner* — John Olszewski
*Assistant Examiner* — Gerrad A Foster
(74) *Attorney, Agent, or Firm* — Spano Law Group; Joseph S. Spano (57) ABSTRACT

A service robot includes a wheeled, robotic vehicle and a movable payload platform. A position of the payload platform is controlled to reduce the distance between the center of mass of the service robot and a center of rotation of the vehicle moving along a motion trajectory. Induced centrifugal forces are reduced, allowing for safe operation at higher speeds. In some examples, the payload platform is moved such that the center of mass of the service robot is approximately aligned with the center of rotation of the vehicle. In some embodiments, at least one wheel of the service robot is controlled to maintain a level orientation of the service robot as it traverses uneven terrain. In some embodiments, the service robot includes an inflatable torso structure that allows an upper body robot to bend in a controlled manner to interact with users and a payload loaded onto the payload platform.

11 Claims, 11 Drawing Sheets

300

MOVE A SERVICE ROBOT ALONG A MOTION TRAJECTORY ACROSS A GROUND SURFACE, THE SERVICE ROBOT INCLUDING A FRAME AND A PAYLOAD PLATFORM CARRYING A PAYLOAD, WHEREIN THE PAYLOAD PLATFORM IS MOVABLE WITH RESPECT TO THE FRAME ~301

MOVE THE PAYLOAD PLATFORM RELATIVE TO THE FRAME SUCH THAT A CENTER OF MASS OF THE PAYLOAD MOVES TOWARD A CENTER OF ROTATION OF THE SERVICE ROBOT AT A POINT ALONG THE MOTION TRAJECTORY ~302

A # SERVICE ROBOT HAVING MOVABLE CENTER OF MASS

CROSS REFERENCE TO RELATED APPLICATIONS

The present application for patent claims priority under 35 U.S.C. § 119 from U.S. provisional patent application Ser. No. 62/208,480, entitled "Service Robot Having Movable Center of Mass," filed Aug. 21, 2015, the subject matter of which is incorporated herein by reference in its entirety.

TECHNICAL FIELD

The described embodiments relate to systems and methods for payload transport in a service environment.

BACKGROUND INFORMATION

Wheeled, robotic vehicles operating in a service environment such as a hospital, public transportation station, etc., are often required to operate quickly in confined, dynamically changing spaces. In addition, these robotic vehicles must maneuver while carrying heavy payloads to reduce the burden of the people they are serving. In many applications, the mass distribution of the payload varies significantly as the payload changes. Carrying heavy payloads having different mass distributions with high acceleration to operate quickly in confined, dynamically changing spaces presents challenges. The combination of heavy payloads and high acceleration can lead to the generation of excessively high driving forces and the potential for vehicle instability or loss of traction. This can create a hazardous situation in a service environment as the mobile vehicle is often operating in close proximity to humans.

In summary, improvements in the design and control of wheeled, robotic vehicles are desired to improve operational safety while quickly maneuvering in a service environment including humans.

SUMMARY

Methods and systems for transporting a payload in a service environment such as a train station or a hospital are described herein. In one aspect, a service robot includes a wheeled, robotic vehicle and a payload platform that is movable with respect to the vehicle. The position of the payload platform with respect to the vehicle is controlled to reduce the distance between the center of mass of the service robot and a center of rotation of the vehicle moving along a motion trajectory. In this manner, induced centrifugal forces are reduced, allowing for operation at higher speed while maintaining vehicle stability.

In some examples, the payload platform is moved such that the center of mass of the service robot is approximately aligned with the center of rotation of the vehicle. In these examples, the induced centrifugal force is approximately zero. This enables rapid turning capability with a minimum of tractive drive force.

In a further aspect, a service robot includes at least one wheel that is movable in a direction normal to the ground surface. The position of the at least one wheel with respect to the vehicle is controlled in the direction normal to the ground surface to maintain a level orientation of the vehicle as it traverses uneven terrain.

In another further aspect, a service robot includes an upper body robot including an inflatable torso structure that allows the upper body robot to bend in a controlled manner to interact with users and a payload loaded onto the payload platform. In some embodiments, the upper body robot includes one or more inflatable arms attached to the inflatable torso by one or more rotary actuators. In some embodiments, the arms are configured to secure a payload on the payload platform. In some embodiments, the torso and arms are configured to gesture toward a user.

In yet another further aspect, an image capture device is located on the upper body robot to collect images of people and objects in the service environment.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for transporting a payload in a service environment such as a train station or a hospital are described herein. In one aspect, a service robot includes a wheeled, robotic vehicle and a payload platform that is movable with respect to the vehicle. The position of the payload platform with respect to the vehicle is controlled to reduce the distance between the center of mass of the service robot and a center of rotation of the vehicle moving along a motion trajectory. In this manner, induced centrifugal forces are reduced, allowing for operation at higher speed while maintaining vehicle stability.

Figures 1, 2:
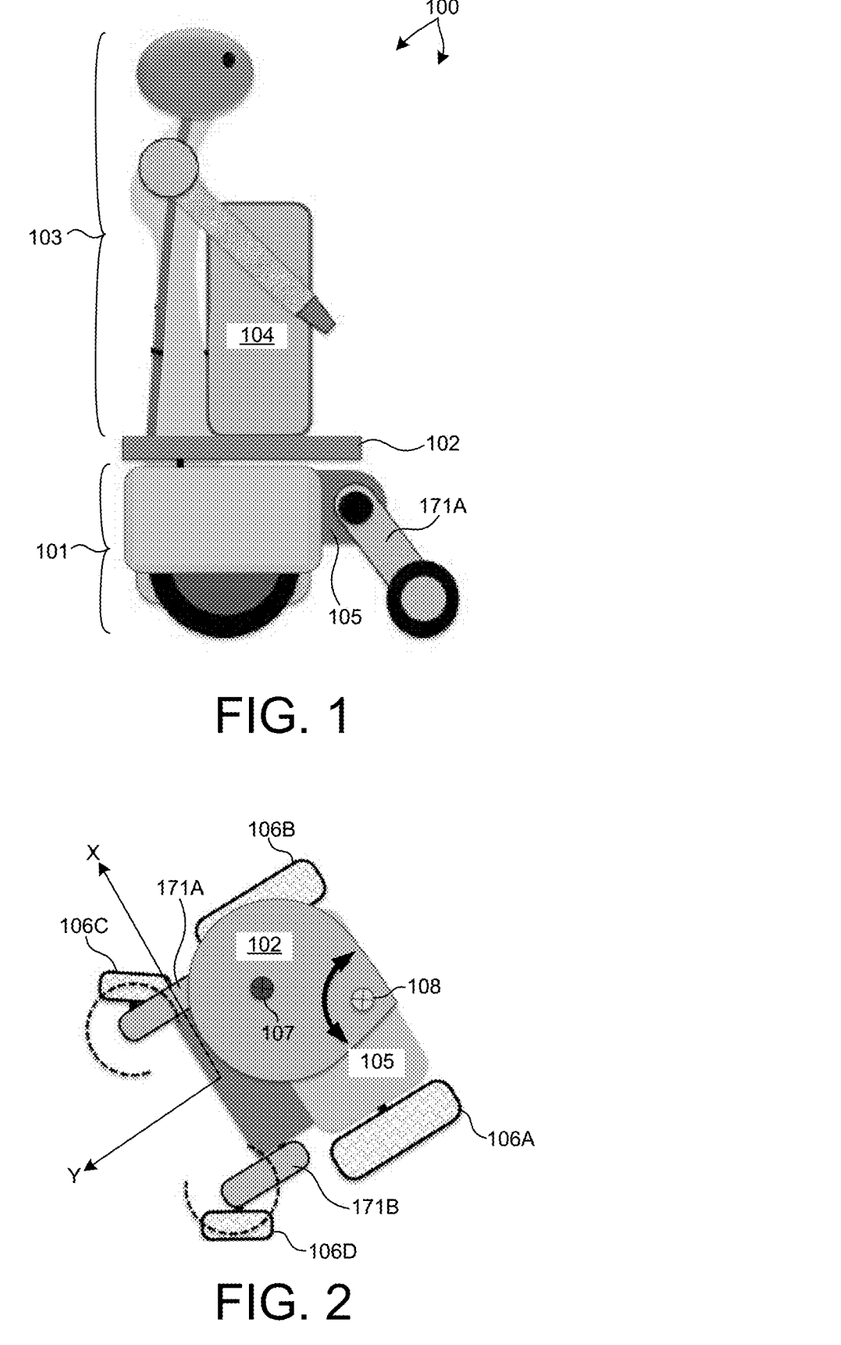
FIG. 1 is a diagram illustrative of an embodiment of a service robot 100 in at least one novel aspect.
FIG. 2 depicts a top view of a wheeled, robotic vehicle and payload platform of service robot 100.

FIG. 1 depicts a service robot 100 in one embodiment. Service robot 100 includes a wheeled, robotic vehicle 101 with driving and steering wheels attached to a frame 105 of the vehicle 101. Service robot 100 also includes a payload platform 102 configured to carry a payload 104. In addition, service robot 100 includes an upper body robot 103 configured to secure the payload 104 to the payload platform 102 and interact with users of service robot 100. In one example, service robot 100 operates in a public transportation station (e.g., train station) and assists passengers with the transport of their luggage through the station. In another example, service robot 100 operates in a public area and assists the public with refuse disposal. In this example, payload 104 includes a refuse container.

FIG. 2 depicts a top view of the wheeled, robotic vehicle 101 and payload platform 102 of service robot 100. As depicted in FIG. 2, wheeled robotic vehicle 101 includes drive wheels 106A and 106B and steering wheels 106C and 106D. In some embodiments, steering wheels 106C and 106D are passive wheels that are free to rotate about multiple axes. In these embodiments, steering wheels 106C and 106D function primarily to support the load normal to the ground surface, while the rotations of drive wheels 106A and 106D dictate the motion trajectory of the wheeled, robotic vehicle 101. In some other embodiments, the orientation of steering wheels 106C and 106D about an axis normal to the ground surface is actively controlled. In these embodiments, steering wheels 106C and 106D also function to control the direction of the motion trajectory of the wheeled, robotic vehicle 101. In some other embodiments, both the rotation of steering wheels 106C and 106D and the orientation of steering wheels 106C and 106D about an axis normal to the ground surface are actively controlled. In these embodiments, steering wheels 106C and 106D function to control both the direction of the motion trajectory and the velocity along the motion trajectory of the wheeled, robotic vehicle 101.

FIG. 2 depicts an XY coordinate frame fixed to the wheeled, robotic vehicle 101. Also, as depicted in FIG. 2, payload platform 102 is movable with respect to a frame 105 to which the wheels of the wheeled, robotic vehicle are attached and is movable in at least the X-direction. In the embodiment depicted in FIG. 2, a rotary actuator 108 is configured to rotate payload platform 102 about an axis of the rotary actuator 108 and move payload platform 102 with respect to frame 105 of the wheeled, robotic vehicle 101 and in the X and Y directions. In some other embodiments, one or more linear actuators are employed to move payload platform 102 with respect to frame 105 of wheeled, robotic vehicle 101. In some of these embodiments, the one or more linear actuators are employed to move payload platform 102 in the X-direction. In some of these embodiments, the one or more linear actuators are employed to move payload platform 102 in the X and Y directions.

In addition, FIG. 2 depicts the location 107 of the center of mass of the payload 104 placed on top of the payload platform 102. In some embodiments, payload platform 102 includes force sensors (not shown in FIG. 2) to measure the mass of payload 104 and to estimate the location of the center of mass of payload 104 with respect to payload platform 102. In some other embodiments, wheeled, robotic vehicle 101 includes force sensors (not shown in FIG. 2) at each wheel. These force sensors are employed to measure the mass of payload 104 and to estimate the location of the center of mass of the moving mass of service robot 100. In general, the center of mass of the service robot without payload is known apriori and depends on the position of payload platform 102 in a known manner. However, the center of mass of the service robot with payload is unknown apriori due to variation in payload mass and location of the payload on the payload platform 102. Thus, the payload sensors are employed to measure the mass of payload 104 and the location of the center of mass of payload 104 directly, or indirectly based on mass distribution measurements that include elements of service robot 100 with known center of mass. In general, any suitable arrangement of sensors may be employed to measure the location of the center of mass of the payload 104.

Figure 3:
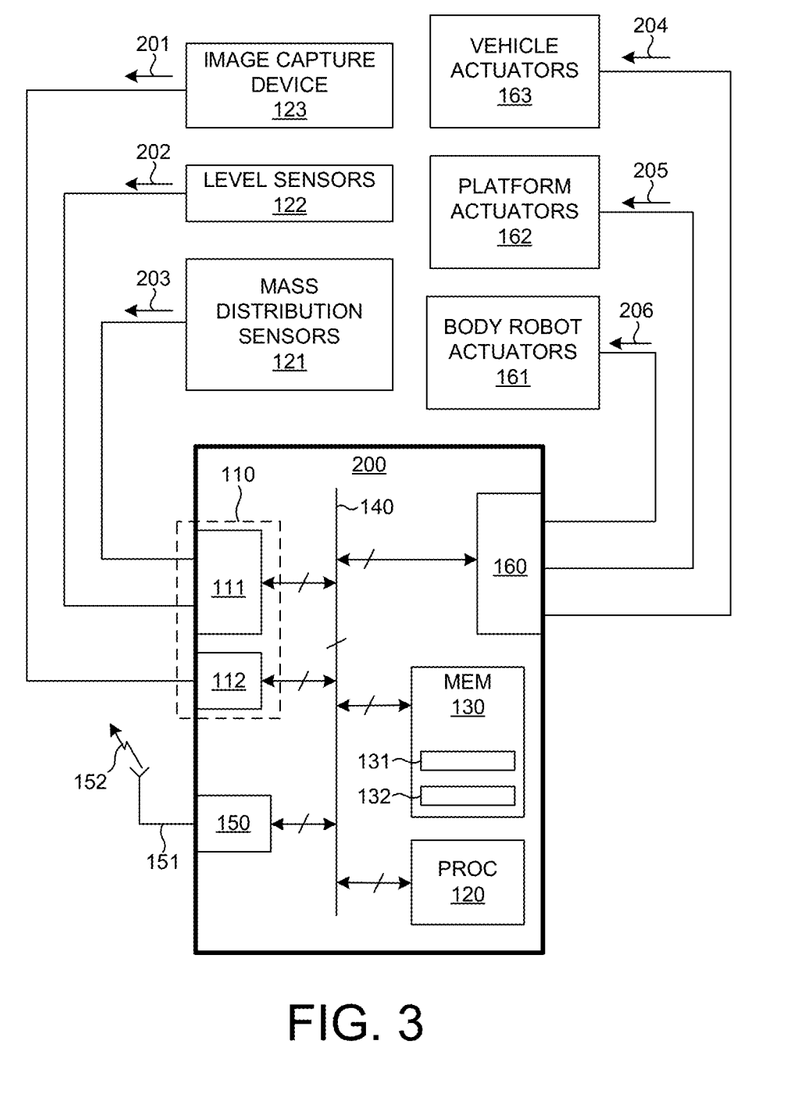
FIG. 3 is a schematic diagram illustrative of some elements of a service robot 100.

FIG. 3 is a diagram illustrative of elements of a service robot 100 including computing system 200, mass distribution sensors 121, level sensors 122, image capture device 123, vehicle actuators 163, payload platform actuators 162, and body robot actuators 161. In the embodiment depicted in FIG. 3, computing system 200 is communicatively coupled to mass distribution sensors 121, level sensors 122, image capture device 123, vehicle actuators 163, payload platform actuators 162, and body robot actuators 161 by wired communications links. However, in general, computing system 200 may be communicatively coupled to any of the sensors and devices described herein by either a wired or wireless communication link.

As depicted in FIG. 3, image capture device 123 and body robot actuators 161 are communicatively coupled to computing system 200. These particular sensors and devices are presented by way of example, and their inclusion as elements of a service robot system is optional. In general, any number of sensors attached to the service robot 100 to monitor position and physical status of the payload may be communicatively coupled to computing system 200.

As depicted in FIG. 3, computing system 200 includes a sensor interface 110, at least one processor 120, a memory 130, a bus 140, a wireless communication transceiver 150, and a controlled device interface 160. Sensor interface 110, processor 120, memory 130, wireless communication transceiver 150, and controlled device interface 160 are configured to communicate over bus 140.

Sensor interface 110 includes analog to digital conversion (ADC) electronics 111. In addition, in some embodiments, sensor interface 110 includes a digital input/output interface 112. In some other embodiments, sensor interface 110 includes a wireless communications transceiver (not shown) configured to communicate with a sensor to receive measurement data from the sensor.

As depicted in FIG. 3, ADC 111 is configured to receive signals 203 from each of the mass distribution sensors 121. In another non-limiting example, ADC 111 is configured to receive signals 202 from each of the level sensors 122. ADC 111 is further configured to convert the analog signals 202 and 203 into equivalent digital signals suitable for digital storage and further digital processing. ADC 111 is selected to ensure that the resulting digital signal is a suitably accurate representation of the incoming analog signals (i.e., quantization and temporal discretization errors are within acceptable error levels).

As depicted in FIG. 3, digital I/O 112 is configured to receive digital signals 201 from image capture device 123. In this example, image capture device 123 includes on-board electronics to generate digital signals 201 indicative of detected images. In this manner, computing system 200 is configured to interface with both analog and digital sensors. In general, any of the sensors described herein may be digital or analog sensors, and may be communicatively coupled to computing system 200 by the appropriate interface.

Controlled device interface 160 includes appropriate digital to analog conversion (DAC) electronics. In addition, in some embodiments, controlled device interface 160 includes a digital input/output interface. In some other embodiments, controlled device interface 160 includes a wireless communications transceiver configured to communicate with a device, including the transmission of control signals.

As depicted in FIG. 3, controlled device interface 160 is configured to transmit control commands 204 to the vehicle actuators 163 that cause the wheeled, robotic vehicle 101 to move along a desired motion trajectory. In another non-limiting example, controlled device interface 160 is configured to transmit control commands 205 to payload platform actuators 162 to move the center of mass of the payload toward the center of rotation of the service robot 100 as described herein. In yet another non-limiting example, controlled device interface 160 is configured to transmit command signals 206 to body robot actuators 161 that cause the upper body robot to move in the desired manner as described herein.

Memory 130 includes an amount of memory 131 that stores measurement data collected from sensors 121 and 122 and image capture device 123. Memory 130 also includes an amount of memory 132 that stores program code that, when executed by processor 120, causes processor 120 to implement payload repositioning functionality and upper body robot functionality as described herein.

In some examples, processor 120 is configured to store digital signals generated by sensor interface 110 onto memory 131. In addition, processor 120 is configured to read the digital signals stored on memory 131 and transmit the digital signals to wireless communication transceiver 150. Wireless communications transceiver 150 is configured to communicate the digital signals from computing system 200 to an external computing device (not shown) over a wireless communications link. As depicted in FIG. 3, wireless communications transceiver transmits a radio frequency signal 152 over antenna 151. The radio frequency signal 152 includes digital information indicative of the digital signals to be communicated from computing system 200 to the external computing device. In one example, images collected by image capture device 123 are communicated to an external computing system for purposes of monitoring the activities of the user.

Figure 4:
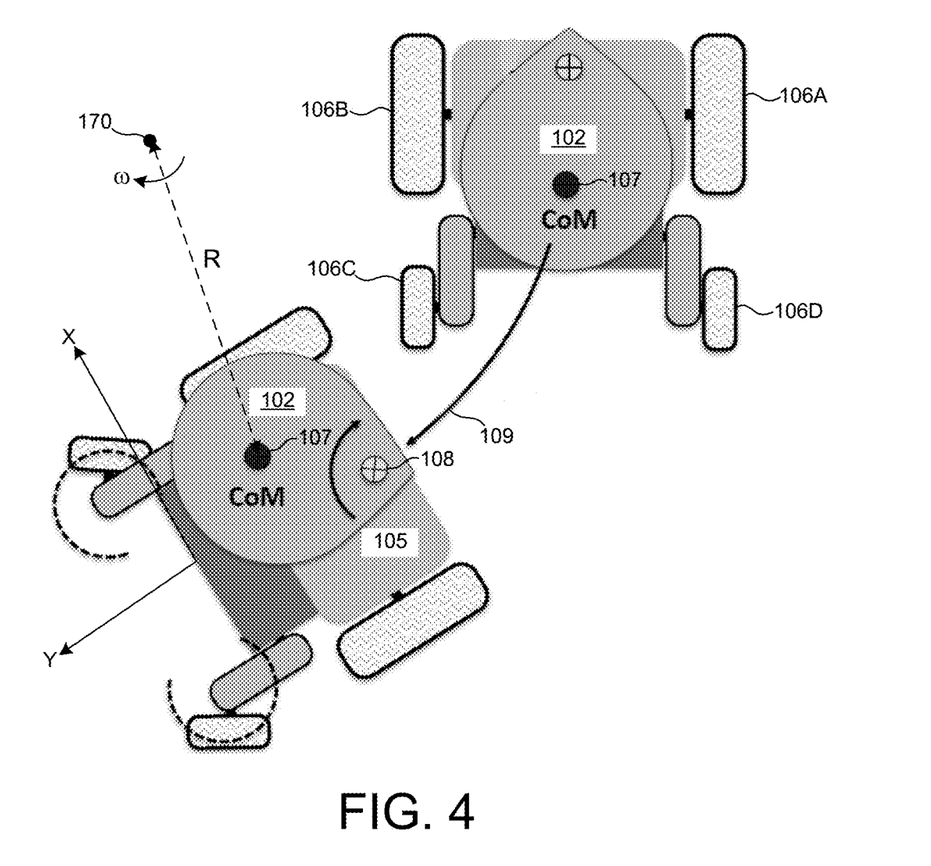
FIG. 4 depicts a wheeled, robotic vehicle of a service robot moving along a curved motion trajectory from a first location to a second location.

As depicted in FIG. 4, wheeled, robotic vehicle 101 moves along a motion trajectory 109 from a first location to a second location. The motion trajectory 109 involves a turn toward the right as viewed from the perspective of the vehicle moving forward. Computing system 200 of service robot 100 controls the vehicle actuators 163 to execute the desired motion trajectory 109. In addition, computing system 200 computes the instantaneous center of rotation of the wheeled, robotic vehicle 101 as the vehicle 101 moves along motion trajectory 109. In the embodiment depicted in FIG. 4, computing system 200 sends command signal 205 to rotary actuator 108 that causes the rotary actuator 108 to rotate payload platform 102 in a direction toward the instantaneous center of rotation 170. In this manner, the distance, R, between the instantaneous center of rotation 170 and the location 107 of the center of mass of the payload 104 is reduced. The movable payload platform 102 is moved such that the center of mass of the wheeled, mobile robotic vehicle, including the payload platform and any payload disposed on the payload platform is moved closer to a center of rotation of the wheeled, mobile robotic vehicle at any point along the motion trajectory of the vehicle. In this manner, the centrifugal forces associated with a turn of the vehicle are reduced. This allows for a more rapid turn of the vehicle for a given set of tractive forces generated by the wheels of the service robot 100.

The centrifugal force induced by the movement of the service robot 100 along the motion trajectory 109 is determined by equation (1), where m is the moving mass, w is the instantaneous angular velocity of the mass about the instantaneous center of rotation, and R is the distance between the center of mass of the moving mass and the instantaneous center of rotation.

$$F_{centrifugal} = m\omega^2 R \quad (1)$$

In some examples, the payload platform 102 is moved such that the center of mass of the service robot 100 is aligned with the center of rotation of the vehicle (e.g., R is approximately zero). In these examples, the induced centrifugal force is approximately zero. This enables rapid turning capability with a minimum of tractive drive force.

Figure 5:
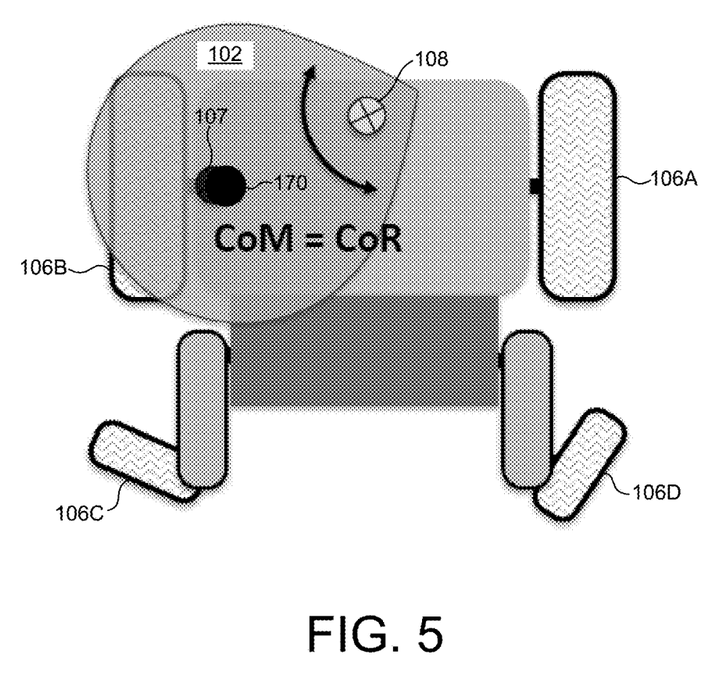
FIG. 5 depicts a service robot executing a rotation about a center of rotation that is approximately aligned with a center of mass of the service robot.

FIG. 5 depicts the service robot 100 executing a rotation about the center of rotation (CoR) 170. As depicted in FIG. 5, computing system 200 of service robot 100 controls the vehicle actuators 163 to execute the desired motion trajectory. In the embodiment depicted in FIG. 5, computing system 200 sends command signal 205 to rotary actuator 108 that causes the rotary actuator 108 to rotate payload platform 102 in a direction toward the instantaneous center of rotation 170 such that the distance between the instantaneous center of rotation 170 and the location 107 of the center of mass of the service robot 100 is approximately zero.

In a further aspect, the service robot 100 includes at least one wheel that is movable in a direction normal to the ground surface. The position of the at least one wheel with respect to the vehicle is controlled in the direction normal to the ground surface to maintain a level orientation of the vehicle as it traverses uneven terrain.

As depicted in FIGS. 1 and 2, the wheeled, robotic vehicle 101 includes two driving wheels attached to the frame of the vehicle (wheels 106A and 106B) and two additional steerable, balancing wheels (wheels 106C and 106D) attached to balancing arms 171A and 171B, respectively, that are, in turn, attached to the frame 105 of the vehicle 101. The balancing arms allow the steering wheels to be moved in a direction normal to the ground surface to accommodate uneven terrain.

Figure 6:
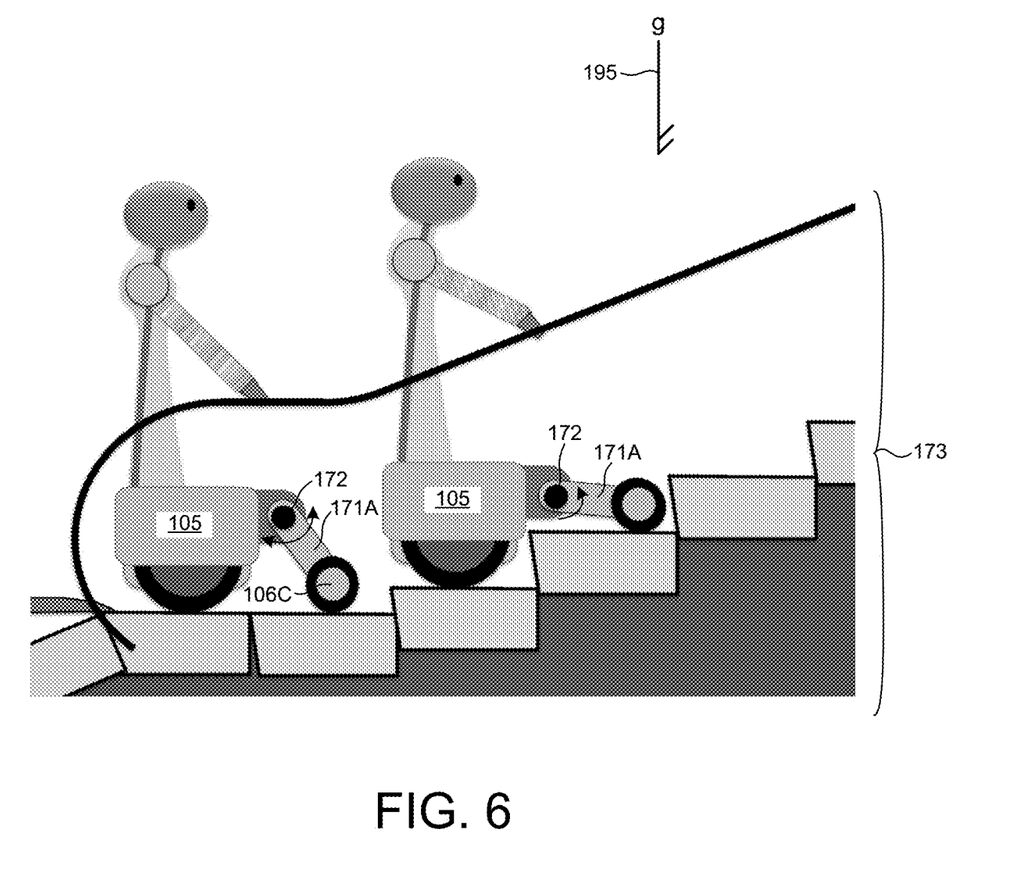
FIG. 6 depicts service robot 100 in an operational scenario that involves traveling up an escalator 173.

FIG. 6 depicts service robot 100 in an operational scenario that involves traveling up an escalator 173. In the embodiment depicted in FIG. 6, service robot 100 includes balance arm 171A coupled between the frame 105 of service robot 100 and wheel 106C of service robot 100. A rotary actuator 172 determines the rotational position of balance arm 171 with respect to frame 105, and hence the position of wheel 106C with respect to frame 105. As depicted in FIG. 6, the steps of escalator 173 are initially level. However, as the escalator moves the service robot forward and upward, the steps move vertically with respect to one another (i.e., in the direction opposite the gravity vector 195). Without control, this would cause service robot 100 to rotate counter-clockwise as viewed from FIG. 6. This may potentially destabilize service robot 100. However, as depicted in FIGS. 2 and 6, computing system 200 receives signals 202 from level sensors 122 mounted to service robot 100. Level sensors 122 (e.g., inertial sensors, etc.) detect the orientation of service robot 100 with respect to the gravitational field (depicted by gravity vector 195). As the vertical movement of the escalator steps cause service robot 100 to begin to tip backwards, this is detected by level sensors 122. In response, computing system 200 communicates command signal 204 to rotary actuator 172 that causes rotary actuator 172 to rotate balance arm 171 upward to level service robot 100. In this example, the rotation of balance arm 171 causes wheel 106C to move upward, opposite the direction of gravity vector 195. Similarly, balance arm 172B is coupled between the frame 105 of service robot 100 and wheel 106D of service robot 100. The control of balance arms 171A and 171B is coordinated to maintain level operation of service robot 100.

In another further aspect, service robot 100 includes an upper body robot including an inflatable torso structure that allows the upper body robot to bend in a controlled manner to interact with users and a payload loaded onto the payload platform. In some embodiments, the upper body robot includes one or more inflatable arms attached to the inflatable torso by one or more rotary actuators. In some embodiments, the arms are configured to secure a payload on the payload platform. In some embodiments, the torso and arms are configured to gesture toward a user.

Figure 7:
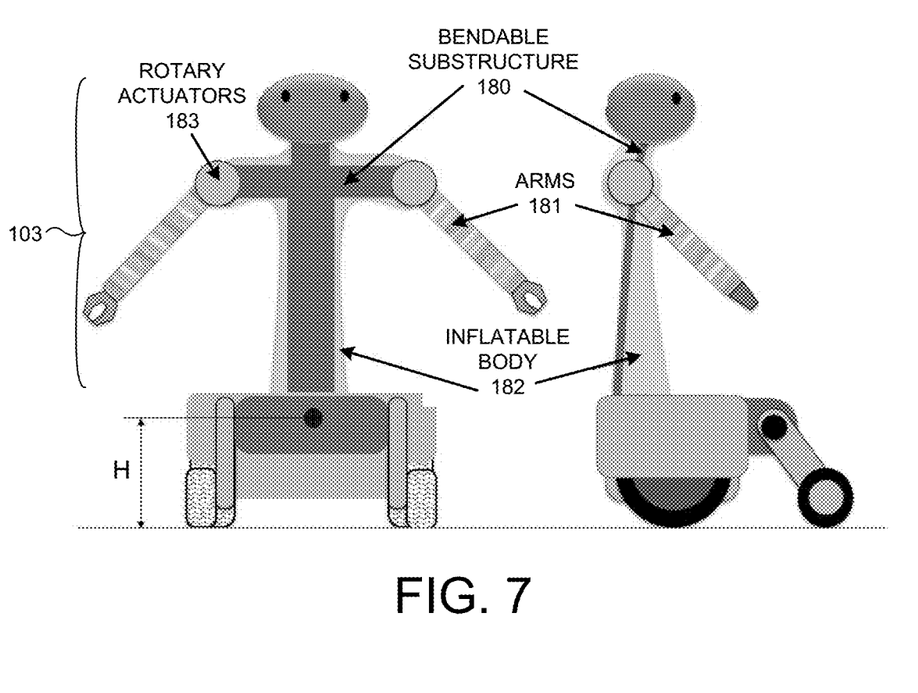
FIG. 7 is illustrative of a service robot including an upper body robot in one embodiment.
Figure 10:
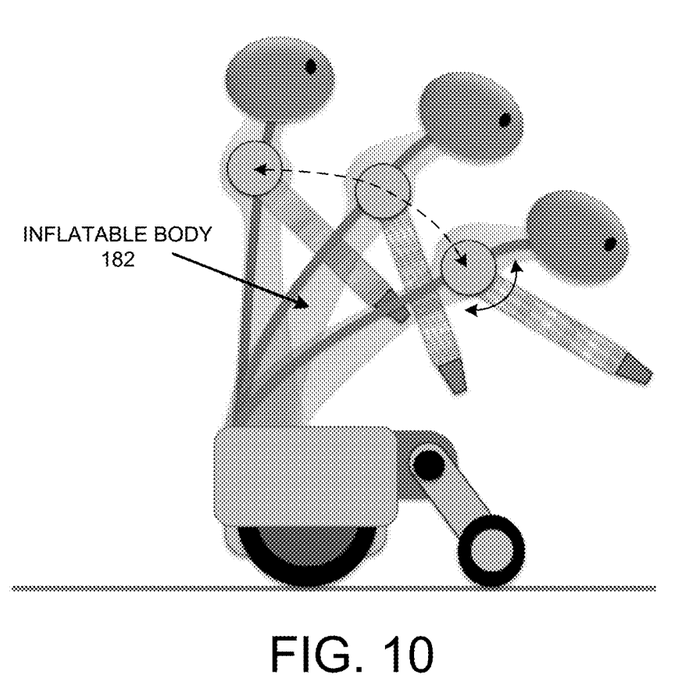
FIG. 10 is illustrative of the inflation of an inflatable body of an upper body robot working in combination with the forces of gravity to determine the position of a bendable substructure of the upper body robot.

FIG. 7 is illustrative of service robot 100 including upper body robot 103 in one embodiment. As depicted in FIG. 7, upper body robot 103 includes an inflatable body structure 182 (i.e., torso structure) that controls the position of a bendable substructure 180 mounted within the inflatable body structure 182. Bendable substructure 180 is a slender structural element that is relatively stiff along its length, but is relatively flexible in bending. The inflation of inflatable body 182, in combination with the forces of gravity determines the position of bendable substructure 180 as depicted in FIG. 10.

Rotary actuators 183 are mounted to upper body robot 103 between the Bendable substructure 180 and arm structures 181. Rotary actuators 183 control the movement of arm structures 181 relative to the bendable substructure 180. In some embodiments, arm structures 181 are also inflatable and provide a soft interface between service robot 100 and people and objects interacting with the service robot 100.

Figure 8:
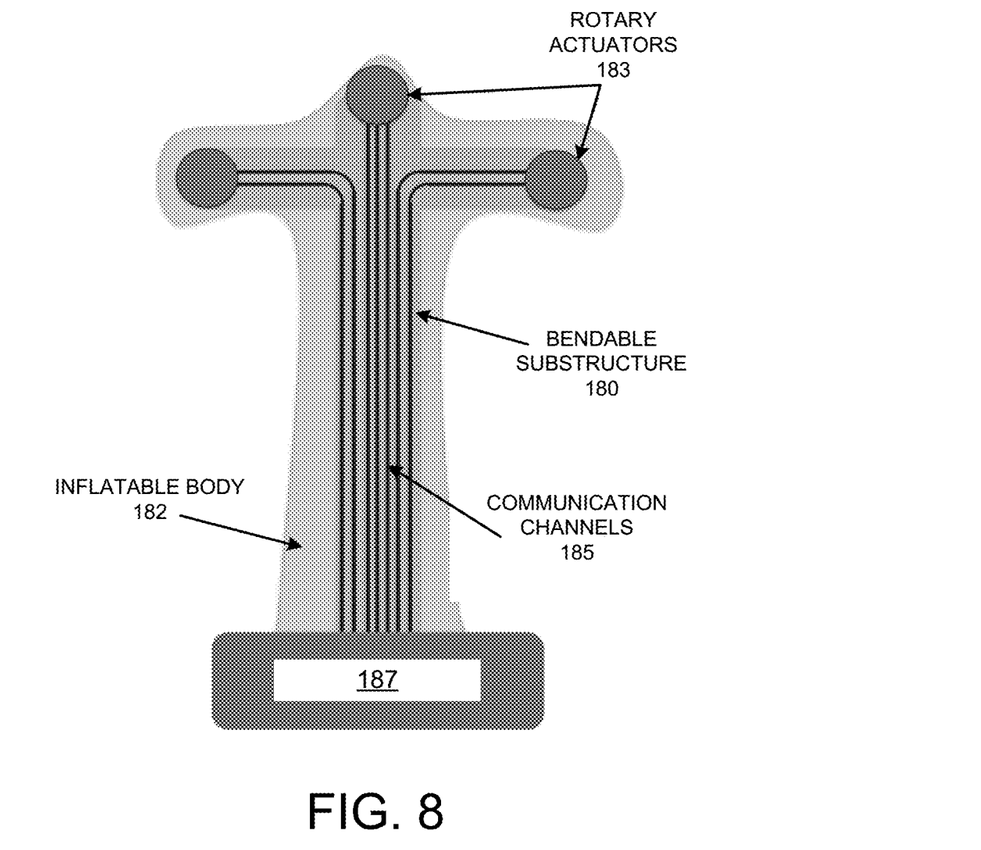
FIG. 8 is illustrative of a bendable substructure of an upper body robot.

As depicted in FIG. 8, bendable substructure 180 includes a flexible substrate such as a thin plate. Bendable substructure 180 also includes a number of physical communication channels 185 attached to the flexible substrate. For example, electrical wiring, pneumatic tubes, actuator cables, etc., may be mounted to the flexible substrate. The physical communication channels 185 are also flexible in bending and communicate power and signals from interface 187 to sensors and actuators mounted to upper body robot 103.

In some embodiments, interface 187 includes actuators mounted to wheeled, robotic vehicle 101. The actuators are coupled to joints of upper body robot 103 by cables that are mounted to a flexible substrate of bendable substructure 180. The position of each actuator is transmitted to each corresponding joint of the upper body robot 103 by the cables. In this manner, each actuator determines the position of each corresponding joint of the upper body robot 103.

Figure 9:
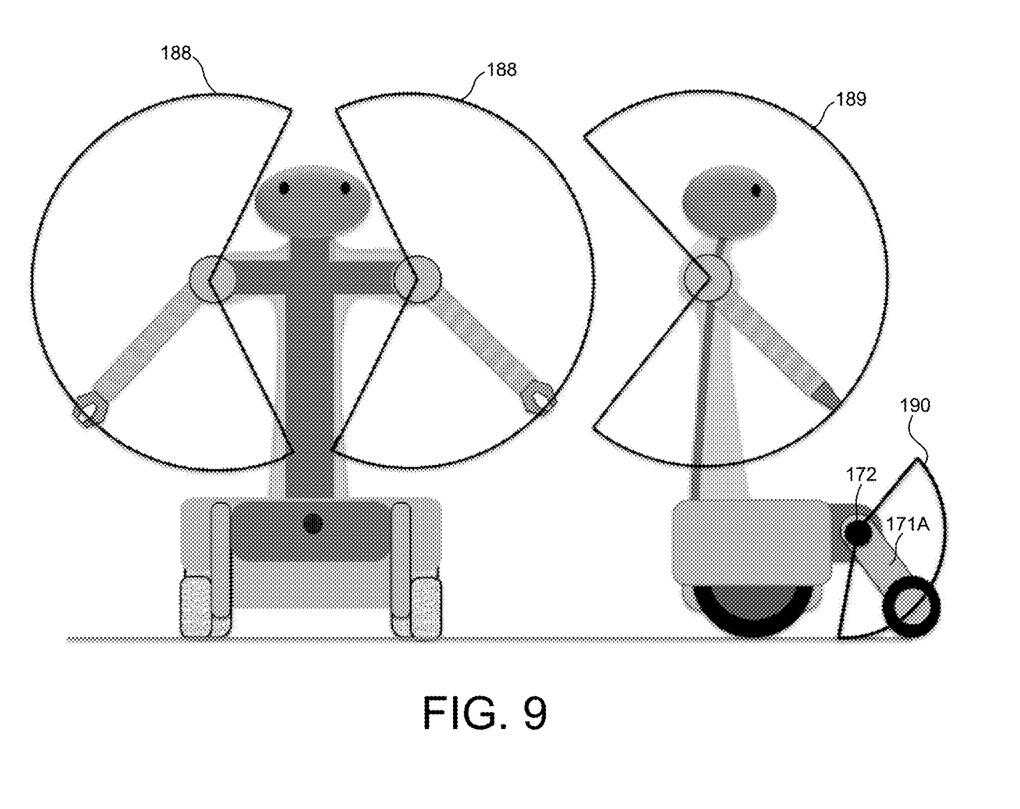
FIG. 9 depicts a workspace of each degree of freedom of each arm structure of the upper body robot.

In some embodiments, the joint between the inflatable body 182 and each arm structure 181 includes a two degree of freedom rotary actuation system (e.g., pan-tilt actuator system) that allows the arm structures 181 to move over a large workspace in two degrees of freedom. FIG. 9 depicts the workspace 188 of each arm structure in one degree of freedom and the workspace 189 of each arm structure in a second degree of freedom that is orthogonal to the first degree of freedom. In addition, FIG. 9 depicts the workspace 190 of balancing arm 171A.

Computing system 200 is configured to communicate command signals 206 to each of the actuators 161 of the upper body robot 103. In this manner, computing system 200 controls the motion of upper body robot 103, including the position or torque at each joint and the inflation of each member of upper body robot 103.

Figure 11:
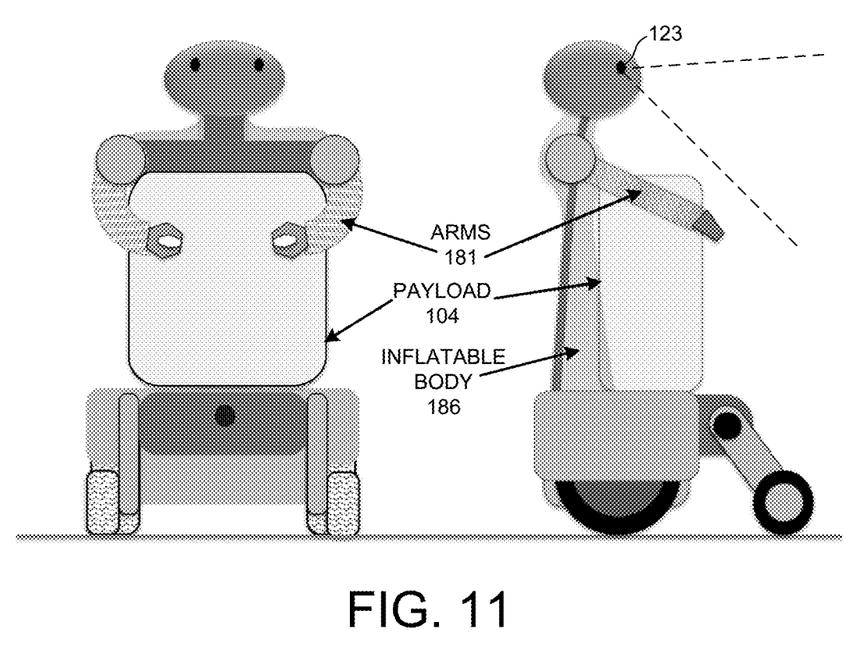
FIG. 11 depicts a payload disposed on a payload platform of a service robot. The payload is in the grasp of two arm structures of an upper body robot of the service robot.

FIG. 11 depicts payload 104 disposed on the payload platform of service robot 100 and in the grasp of arm structures 181. In this operational scenario, computing system 200 communicates command signals 206 to each of the rotary actuators 183 of the upper body robot 103 to properly locate the arm structures 181 and to the pneumatic actuators of inflatable body 182 and the arm structures 181 to set the desired inflation pressure of these elements.

In another further aspect, an image capture device 123 is located on the upper body robot 103. In one example, the image capture device 123 collects images of people and objects in the service environment and transmits signals 201 indicative of the images to computing system 200 for analysis.

Figure 12:
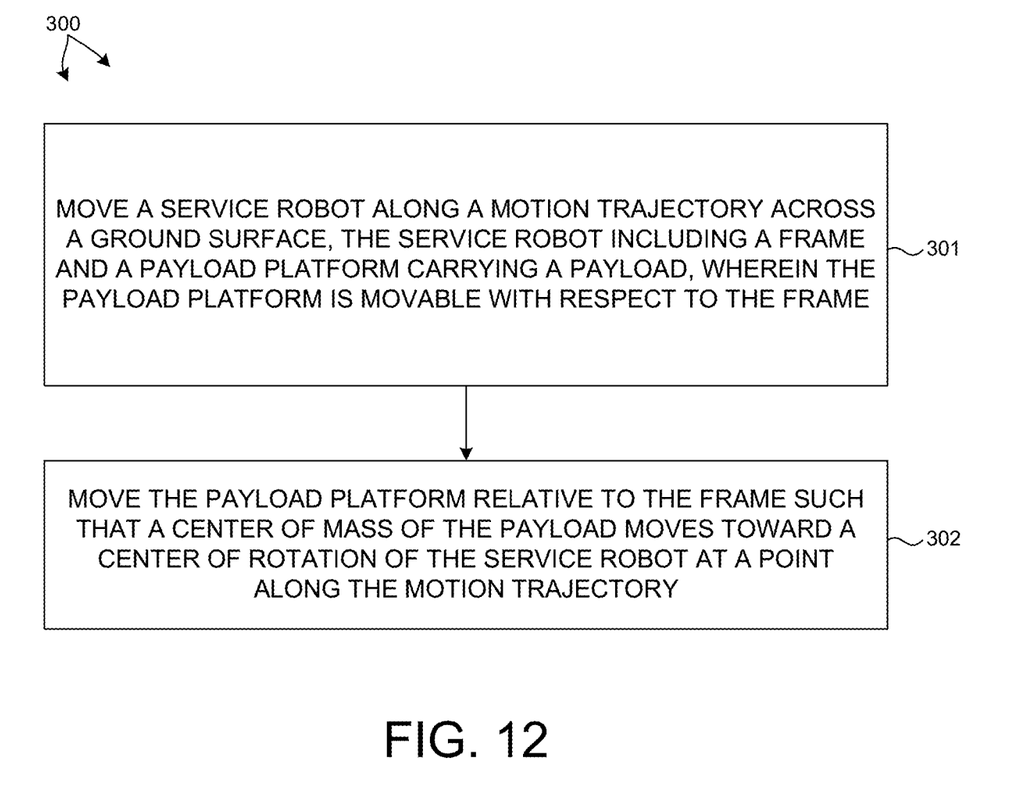
FIG. 12 illustrates a flowchart of a method 300 implementing motion control of a payload platform of a service robot as described herein.

FIG. 12 illustrates a flowchart of a method 300 suitable for implementation by a service robot as described herein. In some embodiments, service robot 100 is operable in accordance with method 300 illustrated in FIG. 12. However, in general, the execution of method 300 is not limited to the embodiments of service robot. 100 described with reference to FIGS. 1-11. These illustrations and corresponding explanation are provided by way of example as many other embodiments and operational examples may be contemplated.

In block 301, a service robot is moved along a motion trajectory across a ground surface. The service robot includes a frame and a payload platform carrying a payload. The payload platform is movable with respect to the frame.

In block 302, the payload platform is moved relative to the frame such that a center of mass of the payload moves toward a center of rotation of the service robot at a point along the motion trajectory.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus comprising:
   a wheeled, robotic vehicle including a frame and one or more wheels attached to the frame;
   a payload platform configured to carry a payload, wherein the payload platform is movably attached to the wheeled, robotic vehicle;
   a payload platform actuator attached to the frame and the payload platform, the payload platform actuator configured to move the payload platform relative to the frame;
   a computing system configured to:
      communicate one or more control commands to the wheeled, robotic vehicle that causes the wheeled, robotic vehicle to move over a ground surface along a motion trajectory; and
      communicate one or more control commands to the payload platform actuator that cause the payload platform actuator to move a center of mass of the payload toward a center of rotation of the wheeled, robotic vehicle at a point along the motion trajectory;
   a balancing arm coupled between the frame and a wheel of the wheeled, robotic vehicle such that the wheel is movable with respect to the frame in a direction normal to the ground surface; and
   a balancing arm actuator attached to the frame and the balancing arm, the balancing arm actuator configured to move the balancing arm relative to the frame such that the wheel attached to the balancing arm is moved with respect to the frame in a direction normal to the ground surface.

2. The apparatus of claim 1, wherein the computing system is further configured to:
   communicate one or more control commands to the balancing arm actuator that causes the balancing arm actuator to move the wheel in a direction normal to the ground surface toward a level position of the wheeled, robotic vehicle.

3. The apparatus of claim 2, further comprising:
   one or more level sensors configured to detect an orientation of the wheeled, robotic vehicle with respect to a gravitational field and communicate an indication of the orientation of the wheeled, robotic vehicle to the computing system, wherein the computing system is further configured to generate the one or more control commands communicated to the balancing arm actuator based on the orientation of the wheeled, robotic vehicle.

4. An apparatus comprising:
   a wheeled, robotic vehicle including a frame and one or more wheels attached to the frame;
   a payload platform configured to carry a payload, wherein the payload platform is movably attached to the wheeled, robotic vehicle;
   a payload platform actuator attached to the frame and the payload platform, the payload platform actuator configured to move the payload platform relative to the frame;
   a computing system configured to:
      communicate one or more control commands to the wheeled, robotic vehicle that causes the wheeled, robotic vehicle to move over a ground surface along a motion trajectory; and
      communicate one or more control commands to the payload platform actuator that cause the payload platform actuator to move a center of mass of the payload toward a center of rotation of the wheeled, robotic vehicle at a point along the motion trajectory; and
   an upper body robot coupled to the wheeled, robotic vehicle, the upper body robot including an inflatable torso structure and a substructure mounted within the inflatable body structure.

5. The apparatus of claim 4, wherein the substructure is a structural element that is relatively stiff along its length and relatively flexible in bending across its length.

6. The apparatus of claim 4, wherein the computing system is further configured to:
   communicate a control command to a pneumatic actuator of the inflatable torso structure that causes the pneumatic actuator to change an inflation pressure of the inflatable torso structure and change a position of the substructure.

7. The apparatus of claim 5, further comprising:
   one or more one or more arm structures movably attached to the substructure;
   one or more rotary actuators attached to the substructure and each of the arm structures, the one or more rotary actuators configured to move each corresponding arm structure relative to the substructure in one or more degrees of freedom.

8. The apparatus of claim 7, wherein the arm structures are inflatable.

9. A method comprising:
   moving a service robot along a motion trajectory across a ground surface, the service robot including a frame and a payload platform carrying a payload, wherein the payload platform is movable with respect to the frame; and
   moving the payload platform relative to the frame such that a center of mass of the payload moves toward a center of rotation of the service robot at a point along the motion trajectory;
   measuring an orientation of the service robot with respect to a gravitational field; and
   moving a wheel of the service robot in a direction normal to the ground surface to change the orientation of the service robot toward a desired orientation of the service robot with respect to the gravitational field.

10. A method comprising:
    moving a service robot along a motion trajectory across a ground surface, the service robot including a frame and a payload platform carrying a payload, wherein the payload platform is movable with respect to the frame; and
    moving the payload platform relative to the frame such that a center of mass of the payload moves toward a center of rotation of the service robot at a point along the motion trajectory;
    inflating an inflatable torso structure of the service robot that changes a position of a substructure mounted within the inflatable torso structure and changes a position of one or more arm structures attached to the substructure.

11. An apparatus comprising:
a computing system; and
a non-transitory computer readable medium storing an amount of program code that, when executed by the computing system, causes the computing system to:
communicate control commands to move a service robot over a floor surface along a motion trajectory, the service robot including a frame and a payload platform that is movably attached to the frame;
communicate control commands to move the payload platform relative to the frame such that the center of mass of the service robot moves toward a center of rotation of the service robot at a point along the motion trajectory; and
communicate one or more control commands to a balancing arm actuator that causes the balancing arm actuator to move a wheel of the service robot in a direction normal to the ground surface toward a level position of the service robot.

\* \* \* \* \*